United States Patent
Bar-El

(10) Patent No.: US 8,250,320 B1
(45) Date of Patent: Aug. 21, 2012

(54) COMMAND CANCELLATION CHANNEL FOR READ—MODIFY—WRITE OPERATION IN A MEMORY

(75) Inventor: Ran Bar-El, Natanya (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

(21) Appl. No.: 13/366,757

(22) Filed: Feb. 6, 2012

Related U.S. Application Data

(63) Continuation of application No. 12/432,283, filed on Apr. 29, 2009, now Pat. No. 8,112,595.

(60) Provisional application No. 61/049,561, filed on May 1, 2008.

(51) Int. Cl.
*G06F 12/00* (2006.01)

(52) U.S. Cl. ........ 711/155; 711/156; 711/157; 711/163; 711/167; 711/169

(58) Field of Classification Search .................. 711/155, 711/156, 157, 163, 167, 169
See application file for complete search history.

(56) References Cited

U.S. PATENT DOCUMENTS

| | | | |
|---|---|---|---|
| 2004/0174364 A1 | 9/2004 | Shehane et al. | |
| 2005/0007374 A1 | 1/2005 | Kuo et al. | |
| 2007/0011382 A1* | 1/2007 | Roever | 710/240 |
| 2009/0024808 A1* | 1/2009 | Hillier et al. | 711/155 |

OTHER PUBLICATIONS

U.S. Appl. No. 12/432,283, filed Apr. 29, 2009, Ran Bar-El, "Command Cancellation Channel for Read—Modify—Write Operation in a Memory", 43 pages.

\* cited by examiner

*Primary Examiner* — Vu Le
*Assistant Examiner* — Han Yang

(57) ABSTRACT

Some of the embodiments of the present disclosure provide an apparatus comprising a command cancellation channel (CCC) including a plurality of stages, the CCC configured to receive a first memory address of a sequence of memory addresses and a corresponding first modification command, determine that at least a first stage of the plurality of stages includes the first memory address and a corresponding second modification command, and erase the first memory address or cancel the second modification command while shifting the first memory address and the second modification command from the first stage to a second stage. Other embodiments are also described and claimed.

19 Claims, 11 Drawing Sheets

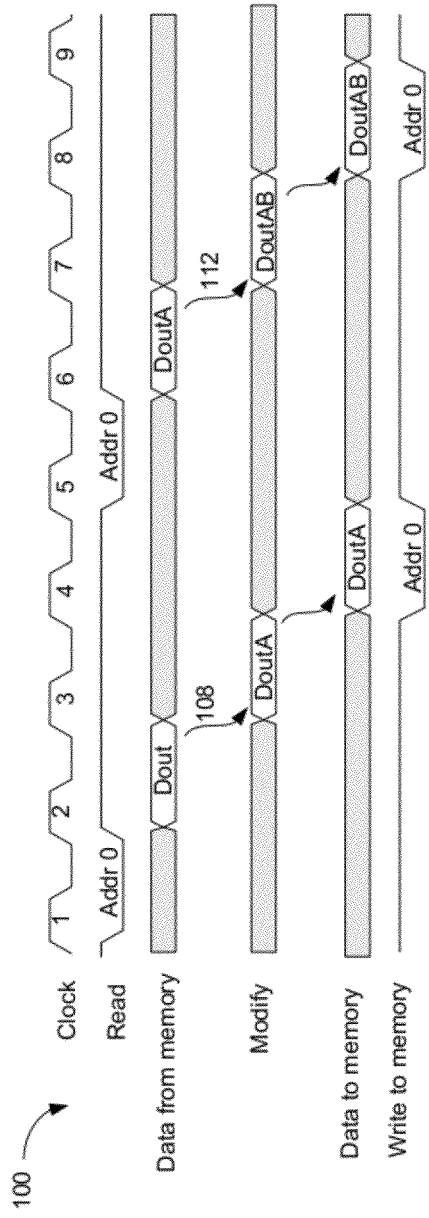
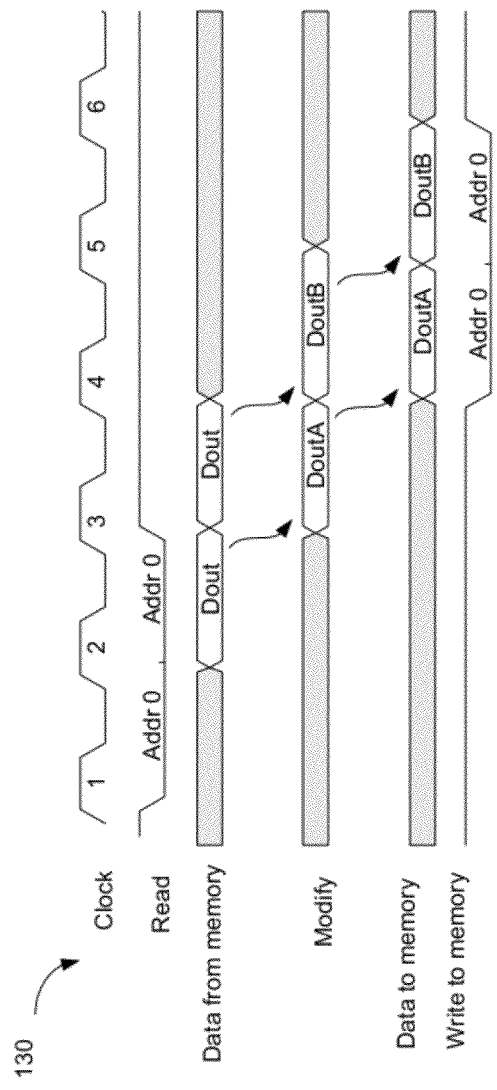

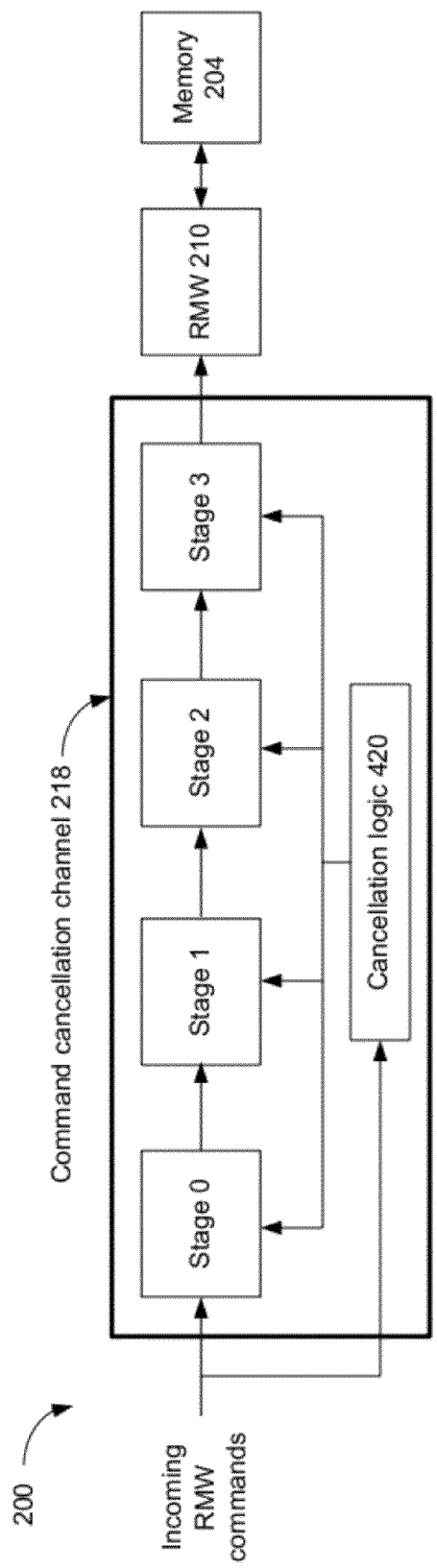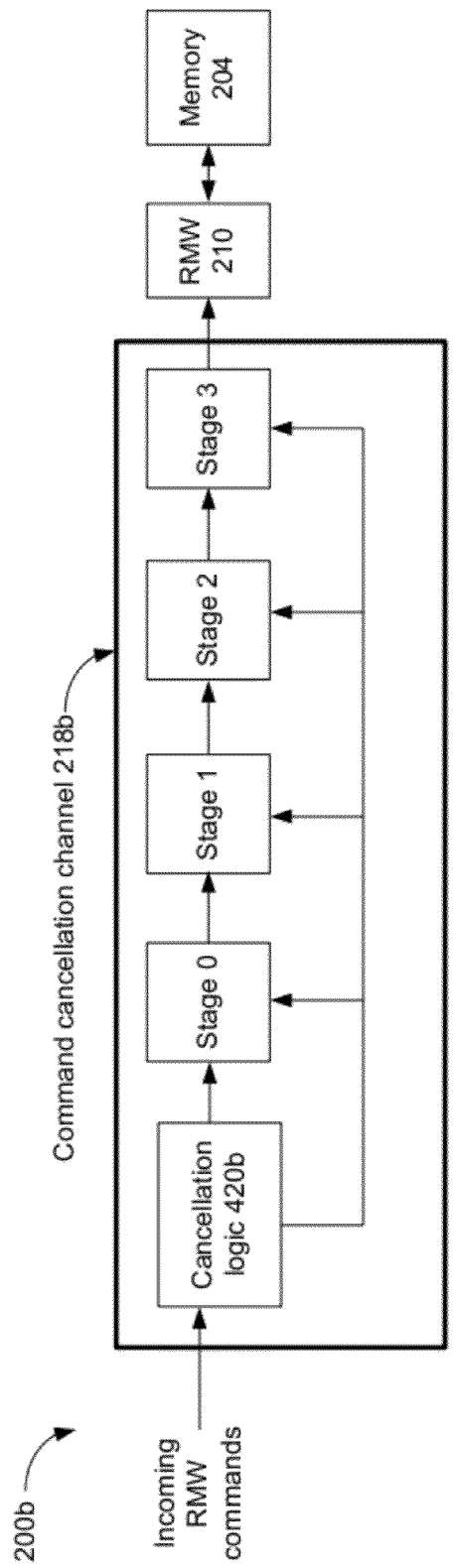

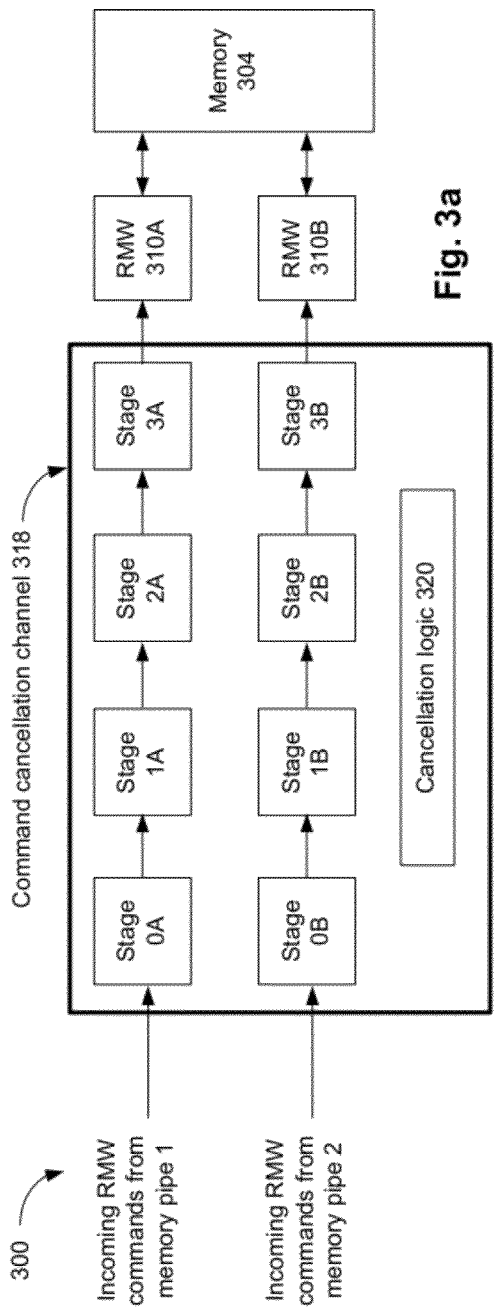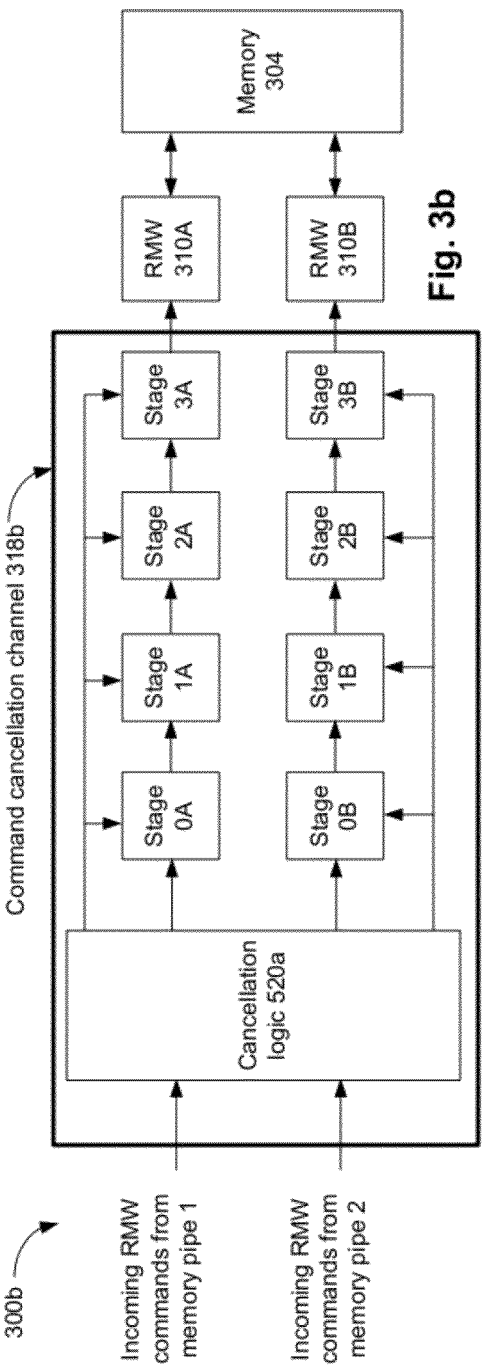

COMMAND CANCELLATION CHANNEL FOR READ—MODIFY—WRITE OPERATION IN A MEMORY

CROSS REFERENCE TO RELATED APPLICATIONS

The present application is a continuation of U.S. patent application Ser. No. 12/432,283 filed Apr. 29, 2009, entitled "COMMAND CANCELLATION CHANNEL FOR READ-MODIFY-WRITE OPERATION IN A MEMORY," now U.S. Pat. No. 8,112,595, issued Feb. 7, 2012, which claims priority to U.S. Patent Application No. 61/049,561 filed May 1, 2008, entitled "Command Cancellation Channel/Block," the entire specifications of which are hereby incorporated by reference in their entirety for all purposes, except for those sections, if any, that are inconsistent with this specification.

TECHNICAL FIELD

Embodiments of the present invention relate to read-modify-write operations in a memory, and more particularly, to a command cancellation channel for read-modify-write operations in a memory.

BACKGROUND

In a read-modify-write (RMW) operation of a memory, data from a memory address may be read, modified, and then written back to the address from which the data was read. An RMW operation may be an example of an atomic operation, e.g., in which the read, modify, and write operations are performed sequentially, and in which one or more other processes may not know about the changes being made by the RMW operation until the entire operation is completed. The modification operation of a RMW operation may modify data read from a memory address in a number of ways. For example, in a fetch and add operation, data from the memory address may be read, a given value may be added to the data (e.g., through a 1's complement addition, a 2's complement addition, or the like), and the modified data may be written back to the memory address. Numerous other types of RMW operations may also be possible.

In various applications, it may be desirable to perform two consecutive RMW operations on a same memory address. For example, a first RMW operation may commence after completion of a previous (e.g., second) RMW command. However, there may be instances where a command for the first RMW operation is received before completion of the previous (e.g., second) RMW operation. It may not always be possible to delay first RMW operation so that the first RMW operation starts after completion of the second RMW operation. In other instances, commands for the first and second RMW operations may be received substantially at same time (e.g., during same clock periods). However, partial overlapping of two RMW operations may result in failure of at least one of the RMW operations.

SUMMARY

In an embodiment, the present disclosure provides an apparatus and a method for command cancellation channel for read-modify-write operation in a memory. More specifically, there is provided, in accordance with an embodiment of the present invention, an apparatus comprising a command cancellation channel (CCC) including a plurality of stages, the CCC configured to receive a sequence of memory read-modify-write (RMW) commands, wherein individual RMW commands include a modification command and a memory address on which the corresponding modification command is to be applied, and a RMW module operatively coupled to the CCC. In an embodiment, the CCC may be further configured to receive a first RMW command of the sequence of RMW commands, the first RMW command including a first memory address and a first modification command, determine that a first stage of the plurality of stages includes a second RMW command that includes the first memory address and a corresponding second modification command, and cancel the second RMW command based at least in part on said determining.

There is also provided, in accordance with an embodiment of the present invention, a method for operating a CCC comprising a plurality of stages, the method comprising receiving, by the CCC, a sequence of memory read-modify-write (RMW) commands, wherein individual RMW commands include a modification command and a memory address on which the corresponding modification command is to be applied, wherein the sequence of RMW commands include at least a first RMW command, and wherein the first RMW command includes a first memory address and a corresponding first modification command, determining, in response to receiving the first RMW command, that at least a first stage of the plurality of stages includes a second RMW command that includes the first memory address and a corresponding second modification command, and canceling the second RMW command based at least in part on said determining.

There is also provided, in accordance with an embodiment of the present invention, an apparatus comprising a CCC including a first plurality of stages and a second plurality of stages, and a RMW module operatively coupled to the CCC, wherein the CCC is configured to receive a first sequence of RMW commands, wherein individual RMW commands include a modification command and a memory address on which the corresponding modification command is to be applied, and wherein the first sequence of RMW commands include a first RMW command comprising a first memory address and a corresponding first modification command, determine, in response to receiving the first RMW command, that at least a first stage of the first or second plurality of stages includes a second RMW command comprising the first memory address and a corresponding second modification command, and cancel the second RMW command.

There is also provided, in accordance with an embodiment of the present invention, a method for operating a CCC comprising a first plurality of stages and a second plurality of stages, the method comprising receiving a first sequence of memory addresses and a corresponding first sequence of modification commands, including at least a first memory address and a corresponding first modification command, receiving a second sequence of memory addresses and a corresponding second sequence of modification commands, shifting, during each clock period, the first sequence of memory addresses and the corresponding first sequence of modification commands through individual stages of the first plurality of stages, shifting, during each clock period, the second sequence of memory addresses and the corresponding second sequence of modification commands through individual stages of the second plurality of stages, determining, in response to receiving the first memory address and the corresponding first modification command, that at least a first stage of the first or second plurality of stages includes the first memory address and a corresponding second modification command, and erasing the first memory address or canceling the second modification command while shifting the first memory address and the second modification command from the first stage to a second stage of the first or second plurality of stages or to a RMW module operatively coupled to the CCC.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 1a illustrates an example of a timing diagram of two RMW operations, wherein a RMW operation for a memory address is commenced after completion of a previous RMW operation on the same memory address;

FIG. 1b illustrates an example of a timing diagram of two RMW operations, where a RMW operation is commenced before completion of a previous RMW operation;

FIG. 2a schematically illustrates an example of a RMW system that includes a command cancellation channel (CCC), in accordance with an embodiment of the present invention;

FIG. 2b schematically illustrates another example of a RMW system that includes a CCC, in accordance with an embodiment of the present invention;

FIG. 3a schematically illustrates an example of a RMW system that includes a CCC operatively coupled to a plurality of memory pipes, in accordance with an embodiment of the present invention;

FIG. 3b schematically illustrates another example of a RMW system that includes a CCC operatively coupled to a plurality of memory pipes, in accordance with an embodiment of the present invention;

DETAILED DESCRIPTION OF EMBODIMENTS OF THE INVENTION

Figure 1C:
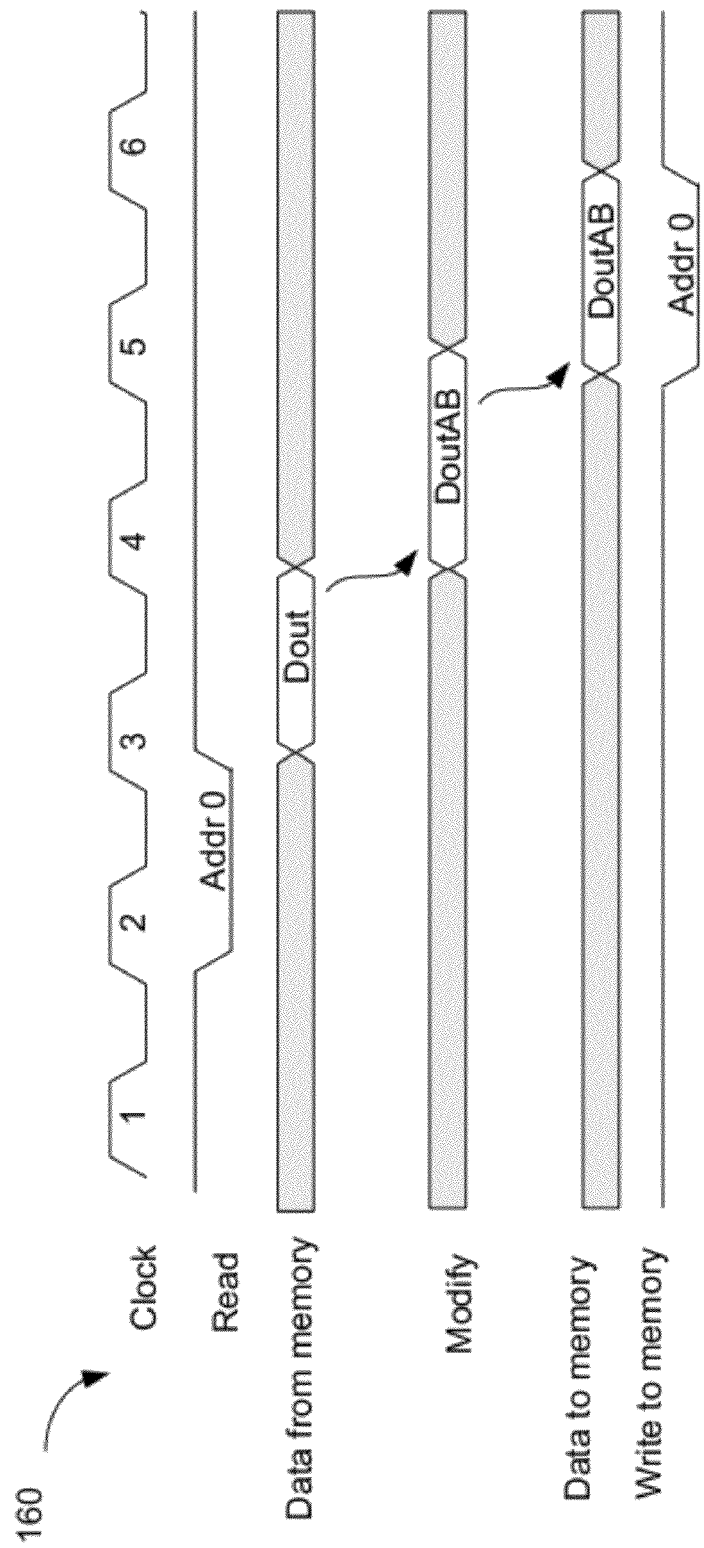
FIG. 1c illustrates an example of a timing diagram in which two RMW operations are combined and executed as a single RMW operation, in accordance with an embodiment of the present invention.

FIG. 1a illustrates an example of a timing diagram 100 of two RMW operations, wherein a RMW operation for a memory address (e.g., memory address Addr 0) is commenced after completion of a previous RMW operation on the same memory address (e.g., Addr 0). Prior to the start of the RMW operations, data Dout may be stored in the memory address Addr 0. It may be desirable to modify the value of the data stored in Addr 0 from Dout to DoutA (e.g., by adding a value A to Dout) during the first RMW operation, and further modify the value of the data stored in Addr 0 from DoutA to DoutAB (e.g., by adding a value B to DoutA) during the second RMW operation. A RMW module may be configured to control the RMW operations.

Referring again to FIG. 1, during a first clock period, memory address Addr 0 may be received by the RMW module. During a second clock period, data Dout may be read from the address Addr 0. During a third clock period, the data Dout may be modified to DoutA (e.g., by adding value A to data Dout), as illustrated by arrow 108. During a fourth clock period, the modified data DoutA may be written back to the address Addr 0.

The second RMW operation on the same memory address Addr 0 may start at a fifth clock period (e.g., after completion of the first RMW operation), during which the RMW module may receive the memory address Addr 0. During a sixth clock period, data DoutA (that was written to the memory address during the first RMW operation) may be read from the memory address Addr 0. The data read from the memory may be modified to DoutAB (e.g., by adding a value B to the data DoutA) during the seventh clock period (illustrated by arrow 112), and written back to the memory address Addr 0 during the eighth clock period.

However, there may be situations where a RMW operation for a particular memory address may start before completion of a previous RMW operation for that memory address. FIG. 1b illustrates an example of a timing diagram 130 of two RMW operations, where a RMW operation is commenced before completion of a previous RMW operation. Similar to FIG. 1a, in the RMW operations of FIG. 1b, it may be desirable to modify the value of the data stored in Addr 0 from Dout to DoutA during a first RMW operation, and further modify the value of the data stored in Addr 0 from DoutA to DoutAB during a second RMW operation.

Referring again to FIG. 1b, during a first clock period, memory address Addr 0 may be received by the RMW module for the first RMW operation. During a second clock period, data Dout may be read from the address Addr 0 as a part of the first RMW operation. Additionally, during the second clock period, memory address Addr 0 may be received by the RMW module for the second RMW operation. Thus, the second RMW operation may start from the second clock period. During a third clock period, as a part of the first RMW operation, the data Dout (previously read from the memory address Addr 0) may be modified to DoutA. Also, during the third clock period, as a part of the second RMW operation, data Dout may be read from the memory address Addr 0. During the fourth clock period, as a part of the first RMW operation, the modified data DoutA may be written back to the address Addr 0. At the same time, as a part of the second RMW operation, the data Dout (previously read from the memory address Addr 0) may be modified to DoutB. That is, instead of the second modification operation being carried out on DoutA, the second modification operation may be carried out on Dout, resulting in a modified value of DoutB. During the fifth clock period, as a part of the second RMW operation, the modified data DoutB may be written back to the address Addr 0 (e.g., by overwriting the data DoutA).

Thus, because of partial overlapping of the two consecutive RMW operations, the final data written in the memory address Addr 0 may be DoutB, instead of the intended data of DoutAB. That is, full or partial overlapping of two consecutive RMW operations on the same memory address may create error condition for at least one of the RMW operations. Accordingly, while using conventional RMW methods, a RMW operation for a memory address may start only after completion (e.g., writing back) of a previous RMW operation on the same memory address. However, this may result in reduction of a bandwidth of memory access and/or may result in delay in the RMW operations.

Moreover, partial overlapping of the two consecutive RMW operations may create other error conditions. For example, if the $2^{nd}$ RMW operation in FIG. 1b starts at the third clock period (instead of the second clock period, as illustrated in FIG. 1b), data may be read from Addr 0 during the fourth clock period (as a part of the second RMW operation) and may be written to Addr 0 also during the fourth clock period (as a part of the first RMW operation). In some types of memories, such simultaneous read and write during the same clock period may not be permitted; while in some other types of memories, such simultaneous read and write may create error conditions.

Additionally, a memory may be accessed through a plurality of interfaces or pipes. That is, a plurality of memory pipes may share access to a memory, as is well known to those skilled in the art. For example, four memory pipes may simultaneously access (e.g., read and/or write data) one or more addresses in a memory. While a first memory pipe may access a first memory address in a memory block, a second pipe may simultaneously access a second memory address in the memory block. Additionally, the first memory pipe may perform a first RMW operation on the first memory address, and the second memory pipe may perform a second RMW operation on the same first memory address. However, in case the first and the second RMW operations overlap at least partially, one or more error conditions (e.g., similar to those discussed with respect to FIG. 1b) may occur in at least one of the two RMW operations.

FIG. 1c illustrates an example of a timing diagram 160 in which two RMW operations are combined and executed as a single RMW operation, in accordance with an embodiment of the present invention. Similar to FIG. 1b, in the RMW operations of FIG. 1c, it may be desirable to modify the value of the data stored in Addr 0 from Dout to DoutA (e.g., by adding a value A to Dout) during a first RMW operation using a first RMW command, and further modify the value of the data stored in Addr 0 from DoutA to DoutAB (e.g., by adding a value B to DoutA) during a second RMW operation using a second RMW command. In an embodiment, timing of receiving the first and second RAM commands may be such that the two RMW operations are to overlap at least partially. To avoid the erroneous operations due to overlapping of two RAM operations (as discussed with respect to FIG. 1b), in one embodiment, the first RMW command and the second RMW command for the first and second RAM operations, respectively, may be combined to generate a third RMW command for a third RAM operation. For example, in one embodiment, the third RMW command may add a value (A+B) to Dout during the third RMW operation, and the first and second RMW operations may be cancelled. As illustrated in FIG. 1c, none of the first and second RMW operations may be carried out to memory address Addr 0. Instead, a third RMW operation may be carried out, in which Dout may be directly modified (e.g., by adding value (A+B)) to generate and store DoutAB in memory address Addr0, as will be discussed in more details herein later.

In an embodiment, the first RMW operation may be cancelled, and the second RMW operation may be modified to generate the third RMW operation. In another embodiment, the second RMW operation may be cancelled, and the first RMW operation may be modified to generate the third RMW operation, as will be discussed in more details herein later.

FIG. 2a schematically illustrates an example of a RMW system 200 that includes a command cancellation channel (CCC) 218, in accordance with an embodiment of the present invention. In an embodiment, the RMW system 200 may include a memory 204, and a RMW module 210 operatively coupled to the memory 204. The memory 204 may be any appropriate type of memory, e.g., a random access memory (RAM). The RMW module 210 may be configured to perform one or more RMW operations on one or more addresses in the memory 204. The RMW module 210 may also be operatively coupled to the CCC 218.

The CCC 218 may include a plurality of stages (e.g., stage 0, stage 1, . . . , stage 3). In an embodiment, the individual stages may be comprised of shift registers, buffers, a storage element, a memory, or the like. Although four stages of the CCC 218 are illustrated in FIG. 2a, a different number of stages (e.g., three, five, etc.) may also be included in the CCC 218. In an embodiment, a minimum number of stages included in the CCC 218 may be based at least in part on a maximum number of clock periods (e.g., four clock periods) required to complete a RMW operation by the RMW module 210.

In an embodiment, the CCC 218 may receive a sequence of RMW commands (including, for example, a corresponding sequence of memory addresses and a corresponding sequence of modification commands) intended for a corresponding sequence of RMW operations on the memory 204. For example, the CCC 218 may receive a first RMW command, including a first modification command and a first memory address on which the first modification command may be applied during a first RMW operation. The CCC 218 may be configured to shift, during each clock period, the received sequence of RMW commands (e.g., the sequence of memory addresses and the corresponding sequence of modification commands) through the plurality of stages stage 0, stage 1, . . . , stage 3.

For example, during a first clock period, the CCC 218 may receive the first RMW command (including the first memory address and the corresponding first modification command) for a first RMW operation. During a second clock period, the CCC 218 may shift the first RMW command to stage 0. During the second clock period, the CCC 218 may also receive a second RMW command, including a second memory address and a corresponding second modification command, for a second RMW operation. During a third clock period, the CCC 218 may shift the first RMW command from stage 0 to stage 1, may shift the second RMW command to stage 0, and may receive a third RMW command (including a third memory address and a corresponding third modification command) for a third RMW operation. The process may continue, and during each clock period, the sequence of RMW commands may continue shifting (e.g., shifting from stage 0 to stage 1, . . . , from stage 2 to stage 3) through the stages (e.g., from lower stage on the left in FIG. 2a to the next higher stage on the right), and outputting the RMW commands (including the associated memory address and modification command) of the last (or rightmost) stage 3 to the RMW module 210.

In an embodiment, the CCC 218 may also include a cancellation logic 420 configured to receive the incoming sequence of RMW commands, and operatively coupled to the individual stages of the CCC 218. In an embodiment, the cancellation logic 420 may be configured to modify and/or cancel one or more RMW commands received by the CCC 218 and/or stored in one or more stages of the CCC 218, as will be discussed in more detail herein later.

FIG. 2b schematically illustrates another example of a RMW system 200b that includes a CCC 218b, in accordance with an embodiment of the present invention. One or more components of system 200b of FIG. 2b may be at least partially similar to the corresponding components of system 200 FIG. 2a. However, cancellation logic 420b of system 200b may be operatively coupled to other components of the system in a different manner as compared to the cancellation logic 420 of system 200, as illustrated in FIG. 2b. In an embodiment, the cancellation logic 420b may receive the incoming RMW commands, and may shift the received RMW commands to stage 0.

Figure 2C:
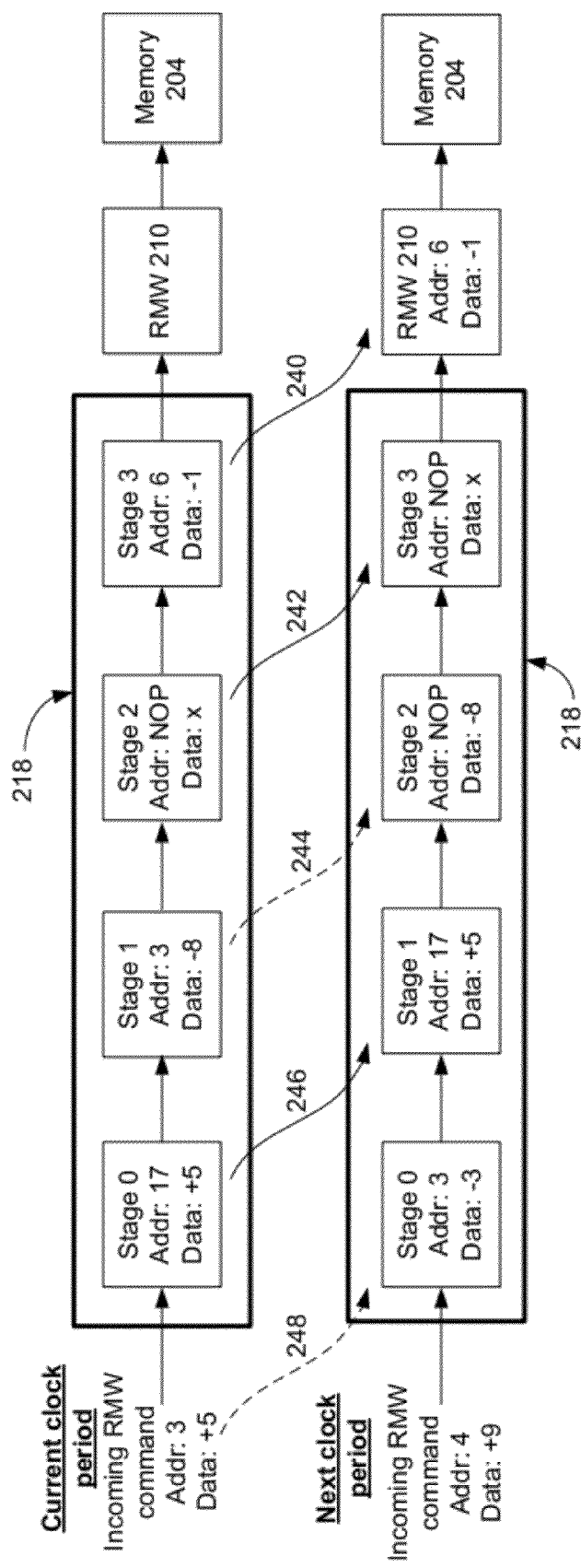
FIG. 2c illustrates an example of an operation of the CCC of FIGS. 2a and 2b, in accordance with an embodiment of the present invention.

FIG. 2c illustrates an example of an operation of the CCC of FIGS. 2a and 2b, in accordance with an embodiment of the present invention. More specifically, FIG. 2c illustrates the status of various stages (e.g., a memory address and a modification command of an associated RMW command stored in individual stages) of the CCC 218 for two consecutive clock periods (identified as current clock period and next clock period in FIG. 2c). For illustrative and clarity purposes, the cancellation logic 420 of FIG. 2a (or the cancellation logic 420b of FIG. 2b) is not illustrated in the CCC 218 of FIG. 2c.

In FIG. 2c, individual modification commands of respective RMW commands may be assumed to be an addition command, and individual modification commands may include a value that may be added to data of corresponding memory address during a corresponding RMW operation. For example, the CCC 218 may receive a RMW command, which may include an address (e.g., Addr 3) of the memory 204, and a corresponding data (e.g., Data −8). The CCC 218 may transmit the RMW command to RMW module 210. In response, the RMW module 210 may perform a RMW operation on data stored in memory address Addr 3, in which the data may be modified through addition of −8 to the data stored in Addr 3. Although FIG. 2c illustrates modification commands associated with addition, any other modification command may also be used in various other embodiments.

As previously discussed, FIG. 2c illustrates the status of various stages of the CCC 218 for a current clock period and a next clock period. During the current clock period, individual stages of the CCC 218 may include a RMW command (comprising a memory address and a corresponding modification command) that was received by the CCC 218 during one or more previous clock periods. For example, during the current clock period, stage 0 may store a RMW command comprising an address Addr 17 and Data +5 that is to be added (through addition command) to the data stored in the address Addr 17 of memory 204. The RMW command, including address Addr 17 and Data +5, in stage 0 may have been received by the CCC 218 during one clock period earlier than the current clock period. Similarly, stage 1 may include Addr 3 and Data −8, which may have been received by the CCC 218 two clock periods earlier than the current clock period. In an embodiment, stage 2 may not include any RMW command (e.g., include a "no operation" or NOP address and/or a null or Data 0 modification command). This may happen, for example, if the CCC 218 did not receive any RMW command during a clock period that may be three clock periods earlier to the current clock period. Stage 3 may include address Addr 6 and Data −1.

Additionally, during the current clock period, the CCC 218 may receive an incoming RMW command comprising address Addr 3 and Data +5. In an embodiment, during the current clock period, the Addr 3 of the incoming RMW command may be same as the address of the RMW command stored in stage 1.

During the next clock period, the RMW command (e.g., Addr 6, Data −1) stored in the last stage (e.g., stage 3) may shift (illustrated by arrow 240) to the RMW module 210 for being executed by the RMW module 210 on memory Addr 6 of memory 204. Additionally, during the next clock period, the RMW commands stored in stages 0 and 2 may shift by one stage to the right (e.g., to stages 1 and 3, respectively, and illustrated by arrows 246 and 242, respectively).

However, during the current clock period, the address Addr 3 of the incoming RMW command may same as the address of the RMW command in stage 1. Accordingly, if the RMW command of stage 1 and the incoming RMW command are shifted through all the stages and to the RMW module 210, then within a few clock periods, the RMW 210 module may start executing the two RMW commands on the same memory address, wherein execution of the two RMW commands may at least partially overlap. This may result in erroneous operation, as discussed with respect to FIG. 2.

To avoid a possibility of erroneous operation (e.g., as discussed with respect to FIG. 1b), in an embodiment, during the next clock period, instead of shifting the RMW command stored in stage 1 to stage 2, the RMW command may be cancelled by, for example, shifting a nullified or cancelled address (e.g., Addr NOP) to stage 2 (illustrated by dotted arrow 444). Although not illustrated in FIG. 2c, in various other embodiments, the address Addr 3 and Data 0 (e.g., no data or no modification command) may be shifted to stage 2 during the next clock period. Put differently, the memory address and/or the modification command of the RMW command in stage 1 may be erased, cancelled and/or nullified while shifting to stage 2 during the next clock period.

In an embodiment, to compensate for canceling the RMW command stored in stage 1, the incoming RMW command of the current clock period may be modified such that the associated modification command (e.g., Data +5) may be combined with the modification command (e.g., Data −8) in stage 1, and the resultant combined (or modified) modification command (e.g., (Data −8)+(Data 5)=(Data −3)) may be shifted to stage 0 during the next clock period (illustrated by dotted arrow 248). Accordingly, in the next clock period, there may be only one stage (e.g., stage 0) that may include a RMW command that includes memory address Addr 3, thereby avoiding changes of partially overlapping RMW operations on memory address Addr 3 of memory 204.

In an embodiment, although not illustrated in FIG. 2c, the modification and/or cancellation of memory address and/or modification commands in the CCC 218 may be controlled by the cancellation logic 420 of FIG. 2a (or cancellation logic 420b of FIG. 2b).

In FIG. 2c, the RMW command of stage 1 (during current clock period) is cancelled while shifting the same to stage 2, and the incoming RMW command (during current clock period) is modified accordingly. Although not illustrated in FIG. 2c, in another embodiment, the incoming RMW command (during current clock period) may be cancelled while shifting the same to stage 0 during the next clock period; and to compensate the cancelled command, the RMW command of stage 1 (during current clock period) may be modified accordingly while shifting the same to stage 2 during the next clock period. Accordingly, in this embodiment, during the next clock period, stage 0 may include (Addr NOP, Data +5), and stage 2 may include (Addr 3, Data −3).

Figure 2D:
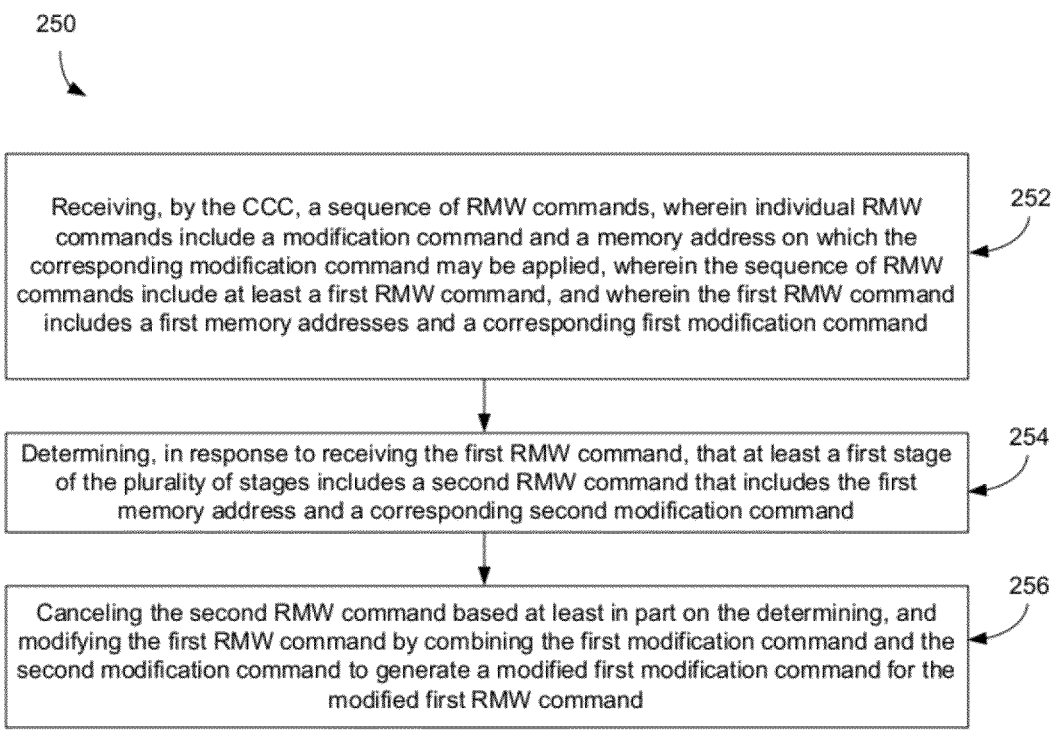
FIG. 2d illustrates an example of a method for operating the CCC of FIGS. 2a-2c, in accordance with an embodiment of the present invention.

FIG. 2d illustrates an example of a method 250 for operating the CCC 218 of FIGS. 2a-2c, in accordance with an embodiment of the present invention. In an embodiment, method 250 may include, at block 252, receiving, by the CCC 218, a sequence of RMW commands. Individual RMW commands may include a modification command and a memory address on which the corresponding modification command may be applied. The sequence of RMW commands may include at least a first RMW command (e.g., the incoming RMW command during the current clock period in FIG. 2c, with Addr 3 and data +5), and wherein the first RMW command may include a first memory addresses (Addr 3) and a corresponding first modification command (Data +5). The CCC 218 may shift, during each clock period, the sequence of RMW commands through individual stages of the plurality of stages (e.g., stages 0, . . . , 3) of the CCC 218.

In an embodiment, method 250 may further include, at block 254, determining, in response to receiving the first RMW command, that at least a first stage (e.g., stage 1 with Addr 3 and Data −8 in FIG. 2c) of the plurality of stages includes a second RMW command that includes the first memory address (Addr 3) and a corresponding second modification command (Data −8). The method 250 may further include, at block 256, canceling the second RMW command based at least in part on the determining at block 254, and modifying the first RMW command by combining the first modification command (e.g., Data +5) and the second modification command (e.g., Data −8) to generate a modified first modification command (e.g., with (Data +5)+(Data −8)=(Data −3)) for the modified first RMW command. As discussed with respect to FIG. 2c, the cancellation of the second RMW command may take place while shifting the second RMW command from stage 1 to stage 2 during the next clock period. The modified first RMW command may be shifted to a second stage (e.g., stage 0) of the plurality of stages during the next clock period.

Figure 2E:
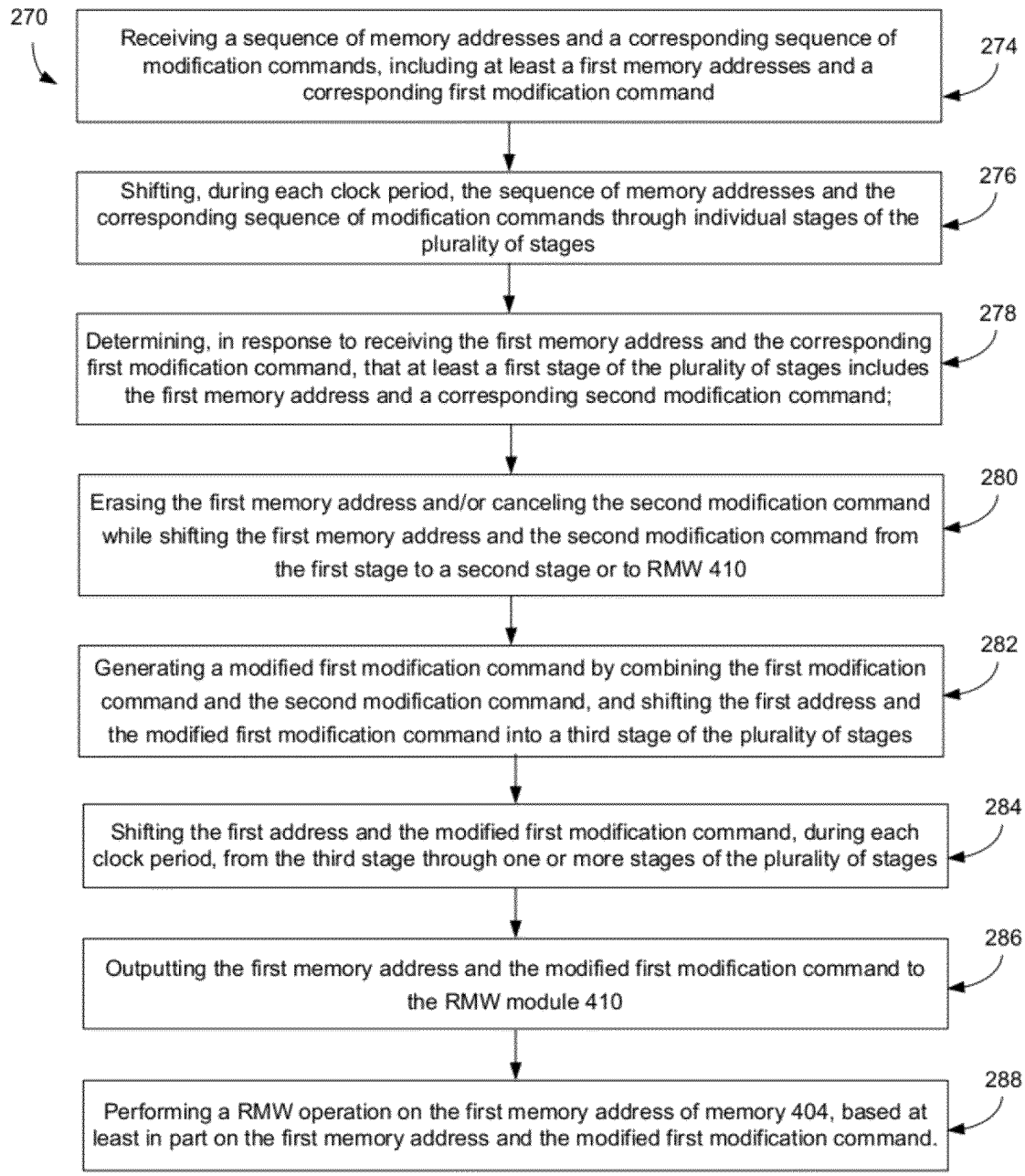
FIG. 2e illustrates another example of a method for operating the CCC of FIGS. 2a-2c, in accordance with an embodiment of the present invention.

FIG. 2e illustrates another example of a method 270 for operating the CCC 218 of FIGS. 2a-2c, in accordance with an embodiment of the present invention. In an embodiment, method 270 may include, at block 274, receiving, by the CCC 218, a sequence of memory addresses and a corresponding sequence of modification commands, including at least a first memory address (e.g., Addr 3) and a corresponding first modification command (e.g., an addition command, with Data +5). The method 270 may further include, at block 276, shifting, during each clock period, the sequence of memory addresses and the corresponding sequence of modification commands through individual stages of the plurality of stages (e.g., stage 0, . . . , stage 3).

The method 270 may further include, at block 278, determining, in response to receiving the first memory address and the corresponding first modification command during the current clock period, that at least a first stage (e.g., stage 1 of FIG. 2c) of the plurality of stages includes the first memory address (e.g., Addr 3) and a corresponding second modification command (e.g., an addition, with Data −8). The method 270 may further include, at block 280, erasing the first memory address (e.g., Addr 3) and/or canceling the second modification command (e.g., Data −8) while shifting the first memory address and the second modification command from the first stage (e.g., stage 1) to a second stage (e.g., stage 2) or to the RMW 210 (e.g., in case the first stage of block 278 is stage 3) during the next clock period.

In an embodiment, the method 270 may further include, at block 282, generating a modified first modification command (e.g., (Data +5)+(Data −8)=(Data −3)) by combining the first modification command (e.g., Data +5) and the second modification command (e.g., Data −8), and shifting the first address (Addr 3) and the modified first modification command (e.g., Data −3) into a third stage (e.g., stage 0) of the plurality of stages. In an embodiment, the operations at block 280 and 282 may occur substantially simultaneously (e.g., during the same clock period (e.g., during the next clock period)).

In an embodiment, the method 270 may further include, at block 284, shifting the first address (e.g., Addr 3) and the modified first modification command (e.g., Data −3), during each clock period, from the third stage (e.g., stage 0) through one or more stages (e.g., stages 1, 2, and 3) of the plurality of stages. The method 270 may further include, at block 286, outputting the first memory address and the modified first modification command to the RMW module 210. The method 270 may further include, at block 288, performing a RMW operation by the RMW module 210 on the first memory address of the memory 204, based at least in part on the first memory address and the modified first modification command received from stage 3 of CCC 218.

FIG. 3a schematically illustrates an example of a RMW system 300 that includes a CCC 318 operatively coupled to a plurality of memory pipes, in accordance with an embodiment of the present invention. In an embodiment, the RMW system 300 may include a memory 304, and RMW modules 310A and 310B operatively coupled to the memory 304. The CCC 318 may be operatively coupled to a first memory pipe (first memory pipe) and a second memory pipe (second memory pipe). The CCC 318 may include a first plurality of stages (stage 0A, stage 1A, . . . , stage 3A) and a second plurality of stages (stage 0B, stage 1B, . . . , stage 3B) for memory pipes 1 and 2, respectively. In an embodiment, the individual stages of the first and second plurality of stages may comprise of shift registers.

The CCC 318 may also include cancellation logic 320 operatively coupled to individual stages of the first and second plurality of stages, and configured to receive incoming data from the first and the second memory pipes. Although not illustrated in FIG. 3a, in an embodiment, the cancellation logic may be operatively coupled between stage 0A and incoming data from first memory pipe and/or may be operatively coupled between stage 0B and incoming data from second memory pipe.

Although a single CCC 318 and a single cancellation logic 320 is illustrated in FIG. 3a for both memory pipes, in an embodiment, two separate CCCs and/or two separate cancellation logic units may also be used for the corresponding two memory pipes. Although only two memory pipes and four stages for each memory pipes are illustrated in FIG. 3a, in an embodiment, the inventive principles may be applicable to a different number of memory pipes and/or different number of stages. In an embodiment, a minimum number of stages included in the first and/or second plurality of stages may be based at least in part on a maximum number of clock periods required to complete a RMW operation by the RMW modules 310A and/or 310B on one or more memory addresses of memory 304.

The CCC 318 may be configured to receive a first sequence of RMW commands, including a corresponding first sequence of memory addresses and a corresponding first sequence of modification commands, from the first memory pipe. For example, the first sequence of RMW commands from the first memory pipe may include a first RMW command, including a first modification command and a first memory address on which the first modification command may be applied during a first RMW operation. The CCC 318 may also be configured to receive a second sequence of RMW commands, including a corresponding second sequence of memory addresses and a corresponding second sequence of modification commands from the second memory pipe. The CCC 318 may be further configured to shift, during each clock period, the first sequence of RMW commands (including the corresponding first sequence of memory addresses and the corresponding first sequence of modification commands) through the individual stages of the first plurality of stages. The CCC 318 may be further configured to shift, during each clock period, the second sequence of RMW commands (including the corresponding second sequence of memory addresses and the corresponding second sequence of modification commands) through the individual stages of the second plurality of stages.

In an embodiment, the CCC 318 (e.g., the cancellation logic 320) may modify, cancel, and/or erase one or more RMW commands (e.g., modify, cancel, and/or erase associated memory addresses and/or modification commands) of the first and/or second sequence of RMW commands, as will be discussed in detail herein later.

FIG. 3b schematically illustrates another example of a RMW system 300b that includes a CCC 318b operatively coupled to a plurality of memory pipes, in accordance with an embodiment of the present invention. One or more components of system 300b of FIG. 3b may be at least partially similar to the corresponding components of system 300 of FIG. 3a. However, cancellation logic 420b of system 200b may be operatively coupled to other components of the system in a different manner as compared to the cancellation logic 420 of system 200, as illustrated in FIG. 2b. For example, the cancellation logic 320b may be operatively coupled between stage 0A and incoming data from first memory pipe and/or may be operatively coupled between stage 0B and incoming data from second memory pipe. The cancellation logic 320b may also be operatively coupled to the individual stages of the first and second plurality of stages (e.g., stage 0A, . . . , stage 3B), and may be configured to control the shifting of RMW commands between individual stages. The cancellation logic 320b may selectively modify, erase and/or cancel one or more RMW commands while shifting the same through individual stages of the first and/or second plurality of stages.

Figure 3C:
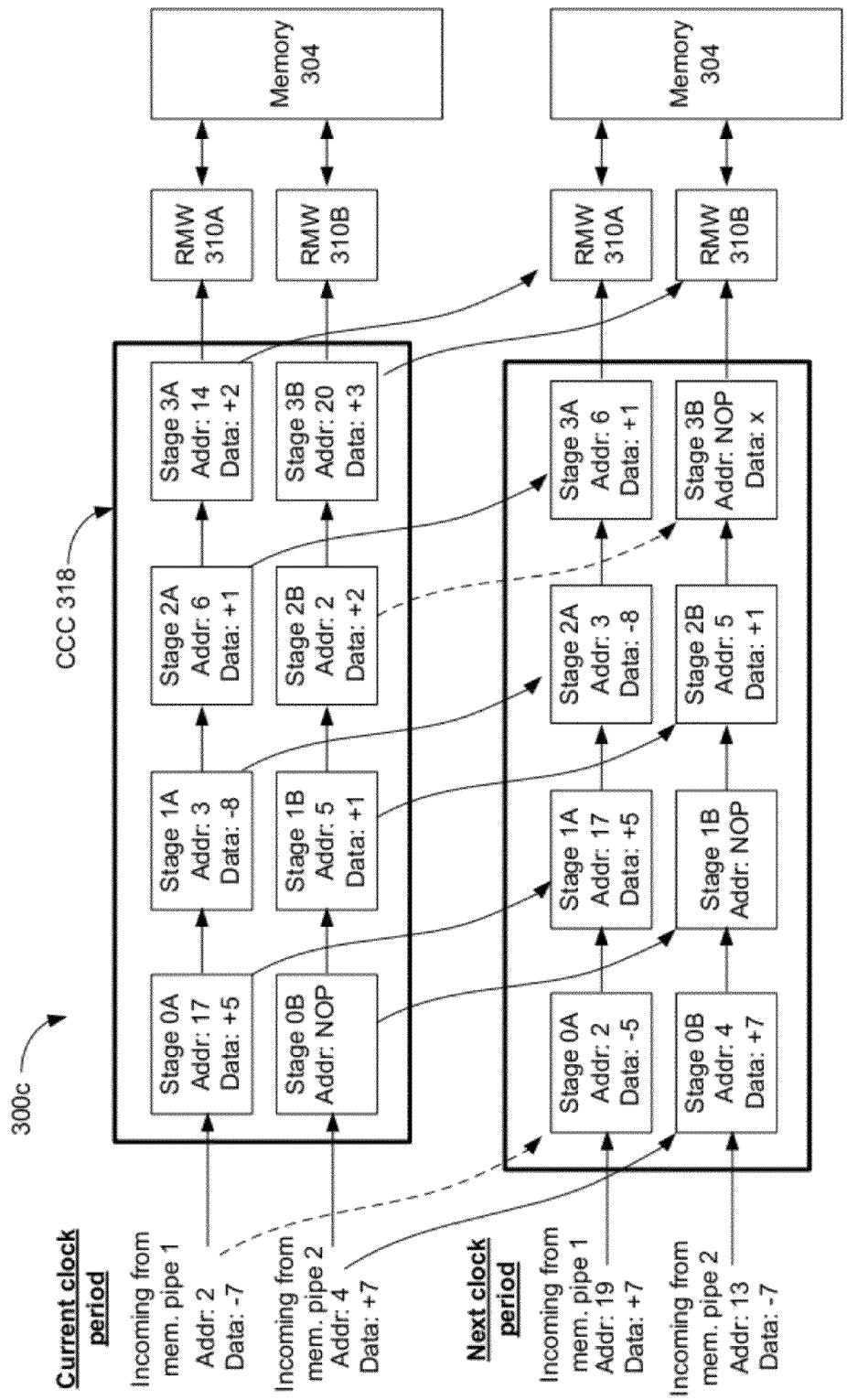
FIG. 3c illustrates example of an operation of the CCC of FIGS. 3a and 3b, in accordance with an embodiment of the present invention.

FIG. 3c illustrates example of an operation of the CCC of FIGS. 3a and 3b, in accordance with an embodiment of the present invention. More specifically, FIG. 3c illustrates the status of various stages (e.g., the memory addresses and the modification commands of the corresponding RMW commands stored in individual stages) of the CCC 318 for two consecutive clock periods (identified as current clock period and next clock period in FIG. 3c). For illustrative and clarity purposes, the cancellation logic 320 of FIG. 3a (or cancellation logic 320b of FIG. 3b) is not illustrated in the CCC 318 of FIG. 3c.

In FIG. 3c, individual modification commands may be assumed to be addition commands, and individual modification commands may include a corresponding value that is to be added to data of corresponding memory address. For example, the CCC 318 may receive an address (e.g., Addr 3) and a corresponding data (e.g., Data −8), and transmit the same to RMW module 310A. In response, the RMW module 310A may perform a RMW operation of data stored in memory address Addr 3, in which the data may be modified through an addition of −8 to the data. Although FIG. 3b illustrates modification commands associated with addition only, any other modification command may also be used in various other embodiments.

Referring again to FIG. 3c, during the current clock period, each stage of the first and second plurality of stages of the CCC 318 may include a memory address and a modification command (e.g., data for addition) of an RMW command received during previous clock periods. For example, stage 0A may store address Addr 17 and Data +5, stage 1A may store Addr 3 and Data −8, stage 2A may store Addr 6 and Data +1, stage 3A may store Addr 14 and Data +2, stage 0B may store Addr NOP (e.g., no RMW command), stage 1B may store Addr 5 and Data +1, stage 2B may store Addr 2 and Data +2, and stage 3B may store Addr 20 and Data +3, Additionally, during the current clock period, the CCC 318 may receive an incoming RMW command with address Addr 2 and Data −7 from first memory pipe and receive an incoming RMW command with address Addr 4 and Data +7 from second memory pipe. In an embodiment, the incoming RMW command from first memory pipe may include address Addr 2 that may be same as the address of the RMW command stored in stage 2B.

During the next clock period, the RMW commands (e.g., memory addresses and the corresponding modification commands) stored in one or more stages may shift to a next stage (or to one of the RMW modules 310A or 310B), as illustrated by the solid arrows. For example, during the next clock period, Addr 17 and Data +5 stored in stage 0A may shift to stage 1A, Addr 3 and Data −8 stored in stage 1A may shift to stage 2A, Addr 6 and Data +1 stored in stage 2A may shift to stage 3A, Addr 14 and Data +2 stored in stage 3A may shift to RMW 310A, Addr NOP stored in stage 0B may shift to stage 1B, Addr 5 and Data +1 stored in stage 1B may shift to stage 2B, and Addr 20 and Data +3 stored in stage 3B may shift to RMW 310B. Additionally, during the next clock period, the incoming RMW command (including address Addr 4 and Data +7) from second memory pipe may shift to stage 0B.

In an embodiment, the CCC 318 (e.g., the command cancellation logic 320) may determine that the address (e.g., Addr 2) of the incoming RMW command from the first memory pipe during the current clock period is the same as the address of the RMW command stored in stage 2B. Based on this determination, during the next clock period, the CCC 318 (e.g., the command cancellation logic 320) may cancel the RMW command stored in stage 2B. For example, the CCC 318 may erase Addr 2 or cancel Data +2 (e.g., by modifying to Data 0) of the RMW command while shifting the same from stage 2B to stage 3B (illustrated by dotted arrow). Accordingly, in an embodiment, during the next cycle, stage 3B may include an Addr NOP and Data x (wherein x may denote a "don't care" condition). In various other embodiments, during the next cycle, stage 3B may include an Addr x (e.g., don't care, Addr 2, etc.), and the data in stage 3B may be modified to 0 (e.g., Data 0).

In an embodiment, based at least in part on determining that the incoming address Addr 2 from the first memory pipe during the current clock period is same as the address stored in stage 2B, the CCC 318 (e.g., the command cancellation logic 320) may modify the incoming RMW command (e.g., modify the associated modification command) while shifting the same to stage 0A during the next clock period (illustrated by dotted arrow). For example, the command cancellation logic 320 may combine the modification command (e.g., Data −7) of the incoming RMW command from the first memory pipe with the modification command of the RMW command stored in stage 2B (e.g., Data +2) to generate a modified modification command of (Data −7)+(Data 2)=(Data −5). The command cancellation logic 320 may shift the modified incoming RMW command (including the modified modification command) to stage 0A during the next clock period.

In an embodiment, the cancellation of the RMW command stored in stage 2B during the current clock period and/or modification of the incoming RMW command from first memory pipe may ensure that the erroneous condition discussed with respect to FIG. 1b do not arise.

In an embodiment, the number of stages in the first and/or second plurality of stages may be based at least in part on a maximum number of clock periods required by the RMW module 310A and/or 310B to perform a RMW operation on one or more memory addresses of the memory 304. For example, as illustrated in FIG. 1c, a RMW operation may take 4 clock periods to complete. Accordingly, each of the first and second plurality of stages of FIGS. 3a-3c may include at least 4 stages to avoid erroneous operating conditions discussed with respect to FIG. 1b.

Figure 3D:
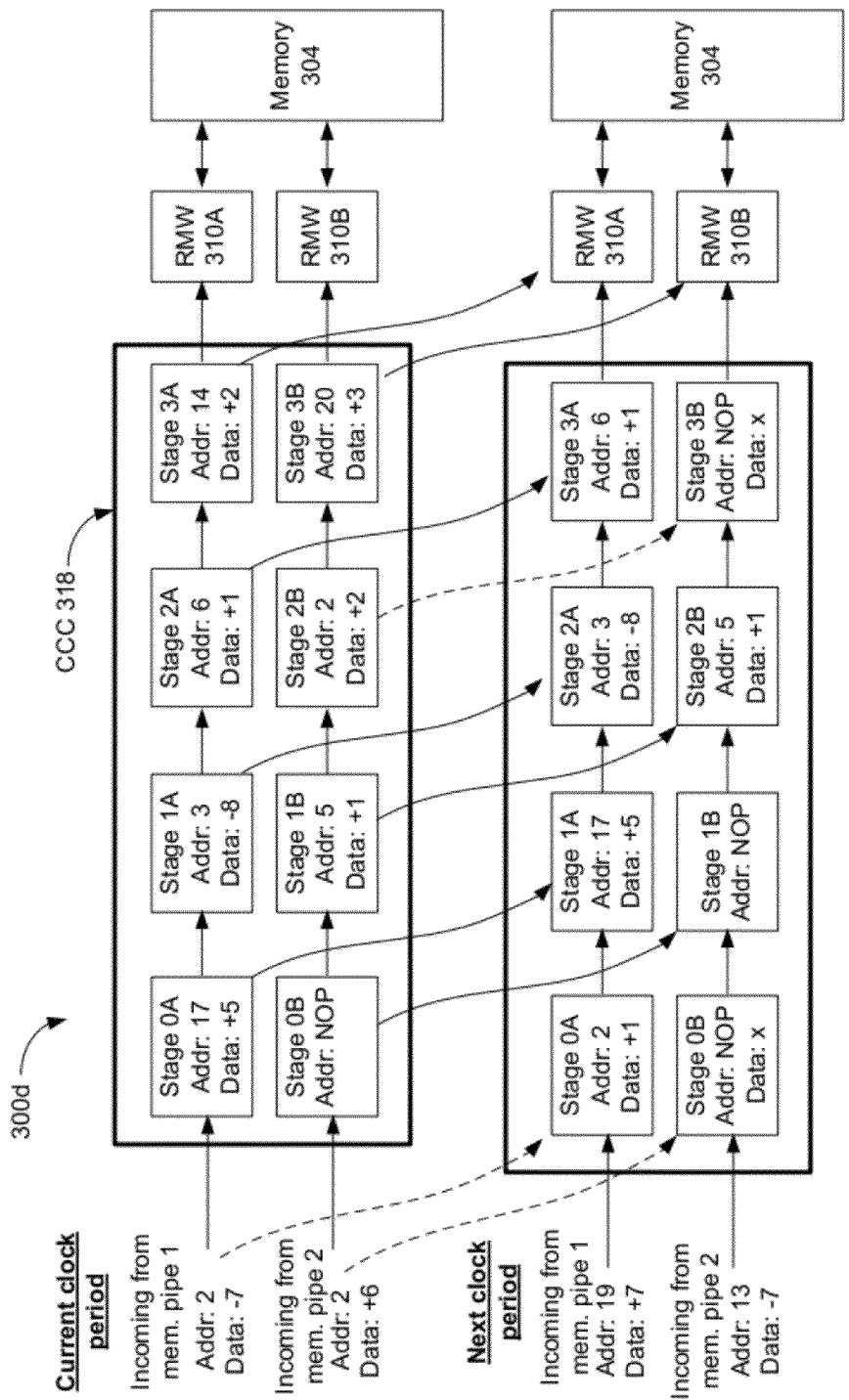
FIG. 3d illustrates another example of an operation of the CCC of FIGS. 3a and 3b, in accordance with an embodiment of the present invention.

FIG. 3d illustrates another example of an operation of the CCC of FIGS. 3a and 3b, in accordance with an embodiment of the present invention. The operation illustrated in FIG. 3d may be at least in part similar to the operation illustrated in FIG. 3c. However, unlike FIG. 3c, in FIG. 3d an incoming RMW command from the second memory pipe during the current cycle may include an RMW command comprising address Addr 2 and Data +6.

In an embodiment, the command cancellation logic 320 may determine that the address (e.g., Addr 2) of the incoming RMW command from the first memory pipe during the current clock period is the same as the address of the incoming RMW command from the second memory pipe, which is also the same as the address of the RMW command stored in stage 2B. Based on this determination, during the next clock period, the command cancellation logic 320 may cancel the RMW command in stage 2B while shifting the same from stage 2B to stage 3B (illustrated by dotted arrow), as discussed with respect to FIG. 3c. Additionally, based on this determination, during the next clock period, the command cancellation logic 320 may cancel the incoming RMW command from the second memory pipe while shifting the same to stage 0B (illustrated by dotted arrow).

Moreover, based on this determination, the command cancellation logic 320 may modify the incoming RMW command (e.g., modify the associated modification command) from the first memory pipe while shifting the same to stage 0A during the next clock period (illustrated by dotted arrow). For example, the command cancellation logic 320 may combine the modification command (e.g., Data −7) of the incoming RMW command from the second memory pipe with the incoming modification command (e.g., Data +6) from the second memory pipe and the modification command stored in stage 2B (e.g., Data +2), and generate a modified modification command of (Data −7)+(Data +6)+(Data 2)=(Data +1). The command cancellation logic 320 may shift this modified modification command of Data +1 to stage 0A during the next clock period.

Figure 4:
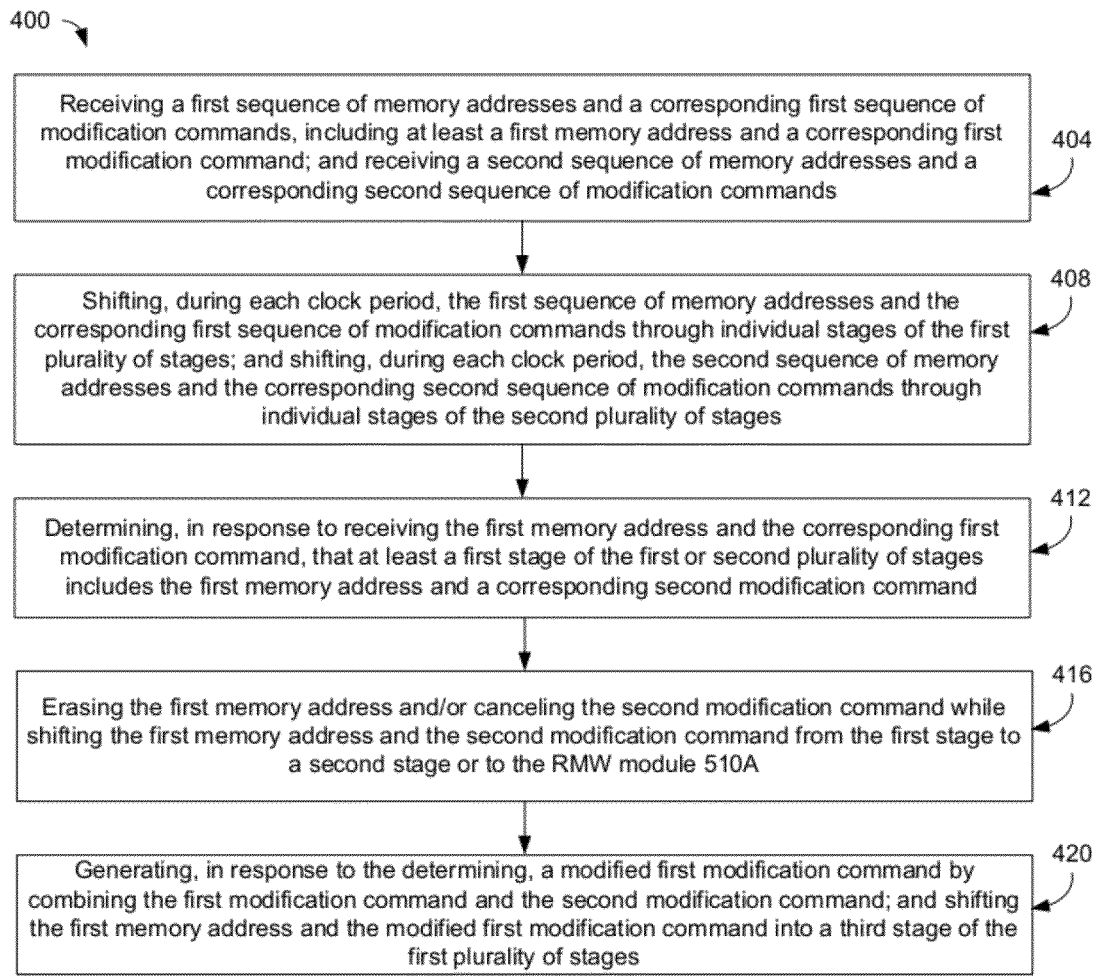
FIG. 4 illustrates an example of a method 400 for operating the CCC of FIGS. 3a-3d, in accordance with an embodiment of the present invention.

FIG. 4 illustrates an example of a method 400 for operating the CCC 318 of FIGS. 3a-3d, in accordance with an embodiment of the present invention. In an embodiment, method 400 may include, at block 404 receiving a first sequence of RMW command, including a corresponding first sequence of memory addresses and a corresponding first sequence of modification commands (e.g., from first memory pipe). The first sequence of RMW command may include at least a RMW command comprising a first memory address (e.g., Addr 2) and a corresponding first modification command (e.g., Data −7), received during the current clock period. The method 400 may further include, at block 404, receiving a second sequence of memory addresses and a corresponding second sequence of modification commands (e.g., from second memory pipe) for a corresponding second sequence of RMW commands.

The method 400 may further include, at block 408, shifting, during each clock period, the first sequence of memory addresses and the corresponding first sequence of modification commands (e.g., by shifting the first sequence of RMW commands) through individual stages of the first plurality of stages (e.g., stages 0A, . . . , 3A). The method 400 may further include, at block 408, shifting, during each clock period, the second sequence of memory addresses and the corresponding second sequence of modification commands (e.g., by shifting the second sequence of RMW commands) through individual stages of the second plurality of stages (e.g., stages 0B, . . . , 3B), as discussed with respect to FIGS. 3c and 3d.

The method 400 may further include, at block 412, determining, in response to receiving the first memory address and the corresponding first modification command (i.e., the first RMW command), that at least a first stage (e.g., stage 2B) of the first or second (e.g., the second) plurality of stages includes the first memory address and a corresponding second modification command (e.g., Data +2).

The method 400 may further include, at block 416, erasing, in response to the determining at 412, the first memory address and/or canceling the second modification command (e.g., canceling the RMW command stored in the first stage) while shifting the first memory address and the second modification command from the first stage (e.g., stage 2B) to a second stage (e.g., 3B) or to the RMW module 310A (e.g., in case the first stage is 3B), as discussed with respect to FIGS. 3c and 3d.

The method 400 may further include, at block 420, generating, in response to the determining at 412, a modified first modification command (e.g., (Data −7)+(Data +2)= (Data −5)) by combining the first modification command (e.g., Data −7) and the second modification command (Data +2); and shifting the first memory address (e.g., Addr 2) and the modified first modification command (e.g., Data −5) into a third stage (e.g., stage 0A) of the first plurality of stages.

Figure 5:
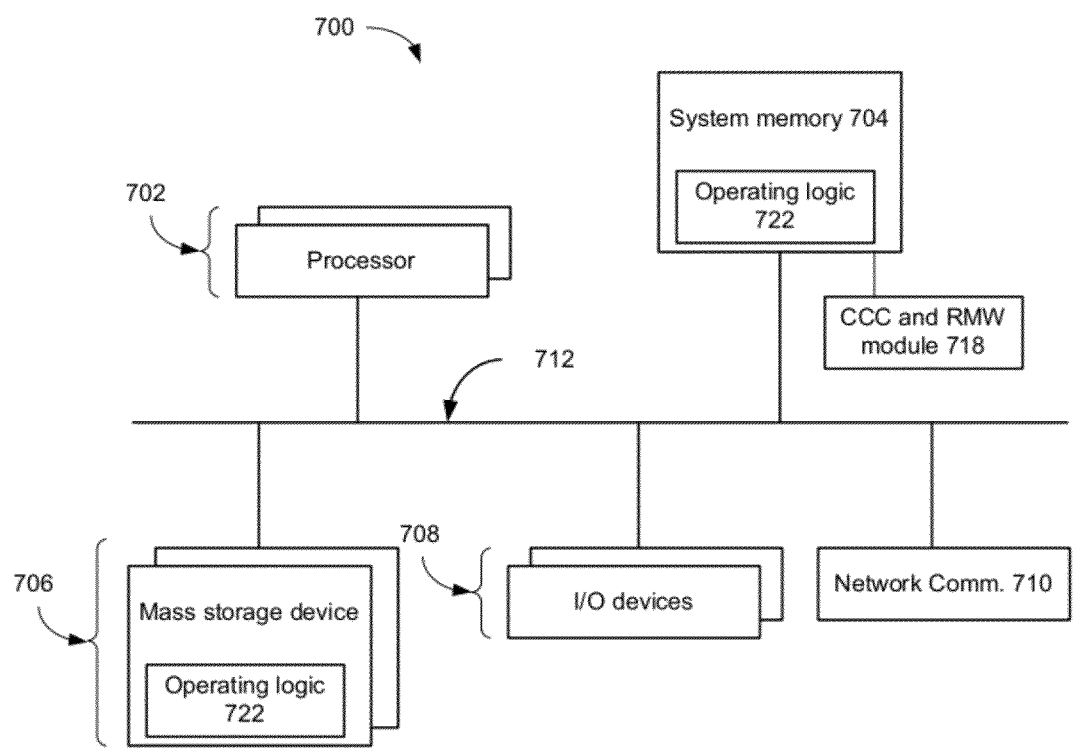
FIG. 5 is a simplified block diagram of a system in which embodiments of the present invention may be implemented.

FIG. 5 is a simplified block diagram of a suitable system 700 in which circuits, memory elements and methods described hereinabove may be implemented. As illustrated, system 700 may include one or more processors or processor cores 702, and system memory 704. For the purpose of this application, including the claims, the terms "processor" and "processor cores" may be considered synonymous, unless the context clearly requires otherwise. Additionally, system 700 may include one or more mass storage devices 706 (such as diskette, hard drive, compact disc read only memory (CDROM) and so forth), input/output devices 708 and communication interfaces 710 (such as network interface cards, modems and so forth). The elements of FIG. 5 may be operatively coupled to each other via system bus 712, which may represent one or more buses. In the case of multiple buses, they may be bridged by one or more bus bridges (not illustrated).

Each of these elements performs its conventional functions known in the art. In particular, system memory 704 and mass storage 706 may be employed to store a working copy and a permanent copy of the programming instructions implementing all or a portion of earlier described functions, herein collectively denoted as 722. The instructions 722 may be assembler instructions supported by processor(s) 702 or instructions that can be compiled from high level languages, such as C.

The permanent copy of the programming instructions may be placed into permanent storage 706 in the factory, or in the field, through, for example, a distribution medium (not shown), such as a compact disc (CD), or through communication interface 710 (from a distribution server (not shown)).

That is, one or more distribution media having instructions 722 may be employed to distribute the instructions 722 and program various client devices. The constitution of these elements 702-712 are generally well known, and accordingly will not be further described.

In an embodiment, the system 700 may include a CCC (similar to the previously discussed CCC 218 of FIGS. 2a-2e and/or CCC 318 of FIGS. 3a-3d) operatively coupled to a memory (e.g., memory 704) though one or more RMW modules (e.g., RMW module 210 of FIGS. 2a-2e and/or RMW modules 310A and/or 310B of FIGS. 3a-3d). For example, a CCC and a RMW module 722 may be coupled to the system memory 704. The CCC may operate to cancel and/or modify one or more RMW operations on one or more memory addresses of the system memory 704, as previously discussed in more detail. In an embodiment, the instructions 722 may include one or more instructions necessary for operating the CCC and RMW module 718.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. This application is intended to cover any adaptations or variations of the embodiment discussed herein. Therefore, it is manifested and intended that the invention be limited only by the claims and the equivalents thereof.

What is claimed is:

1. An integrated circuit comprising:
    a read-modify-write (RMW) module configured to read, modify and write data to a memory; and
    a command pipeline configured to:
        receive and queue RMW commands for execution by the RMW module;
        determine if a second received RMW command is to read, modify and write data to a memory address at which a first received RMW command that is not yet fully executed is to read, modify and write data;
        perform an intermediate data modification operation to modify the data based on the first received RMW command and the second received RMW command before completing execution of one or more of the first received RMW command and the second received RMW command at the memory address; and
        write the data that has been modified to the memory address.

2. The integrated circuit of claim 1, wherein the command pipeline is further configured to cancel one or more of the first received RMW command and the second received RMW command.

3. The integrated circuit of claim 1, wherein the command pipeline comprises a plurality of stages and is further configured to shift, during each clock period, the sequence of RMW commands through individual stages of the plurality of stages.

4. The integrated circuit of claim 3, wherein the number of stages in the plurality of stages is based at least in part on a maximum number of clock periods required by the RMW module to perform an RMW operation on the memory.

5. The integrated circuit of claim 3, wherein individual stages of the plurality of stages comprise a shift register or a buffer.

6. The integrated circuit of claim 1, further comprising the memory operatively coupled to the RMW module, wherein the RMW module is configured to receive one or more RMW commands from the command pipeline, and wherein the RMW module is further configured to perform one or more RMW operations on the memory based at least in part on at least one of the first received RMW command and/or the second received RMW command.

7. The integrated circuit of claim 1, wherein individual modification commands of one or more of the sequence of RMW commands comprises an additional command.

8. The integrated circuit of claim 1, wherein the RMW module is further configured to:
    receive one or more memory addresses and corresponding one or more modification commands; and
    perform one or more RMW operations on a memory operatively coupled to the RMW module based at least in part on the received memory addresses and modification commands.

9. The integrated circuit of claim 8,
    wherein the first sequence of memory addresses and the corresponding first sequence of modification commands are received from a first memory pipe, and
    wherein the second sequence of memory addresses and the corresponding second sequence of modification commands are received from a second memory pipe.

10. A method comprising:
    receiving, by a command pipeline, a sequence of memory read-modify-write (RMW) commands;
    queuing, by the command pipeline, the RMW commands that are received;
    determining, by the command pipeline, if a second received RMW command is to read, modify and write data to a memory address at which a first received RMW command that is not yet fully executed is to read, modify and write data;
    performing, by the command pipeline, an intermediate data modification operation to modify the data based on the first received RMW command and the second received RMW command before completing execution of one or more of the first received RMW command and the second received RMW command at the memory address; and
    writing, by a RMW module operatively coupled to the command pipeline, the modified data to the memory address.

11. The method of claim 10, further comprising cancelling, by the command pipeline, one or more of the first received RMW command and the second received RMW command.

12. The method of claim 10, wherein the command pipeline comprises a plurality of stages and the method further comprises governing the pipeline by periods of a clock and shifting, during each clock period of the clock, the sequence of RMW commands through individual stages of the plurality of stages.

13. The method of claim 12, wherein shifting, during each clock period, the sequence of RMW commands through individual stages of the plurality of stages comprises shifting, during each clock period, the sequence of RMW commands through individual stages of the plurality of stages based at least in part on a maximum number of clock periods required by the RMW module to perform an RMW operation on the memory.

14. The method of claim 12, wherein shifting, during each clock period, the sequence of RMW commands through individual stages of the plurality of stages comprises shifting, during each clock period, the sequence of RMW commands through one of either a shift register or a buffer.

15. The method of claim 10, further comprising:
receiving, by the RMW module, one or more RMW commands from the command pipeline; and
performing one or more RMW operations on the memory based at least in part on at least one of a first received RMW command and/or a second received RMW command.

16. The method of claim 10, further comprising:
receiving, by the RMW module, one or more RMW commands from the command pipeline.

17. The method of claim 16, further comprising:
performing, by the RMW module, one or more RMW operations on a memory operatively coupled to the RMW module, based at least in part on the received one or more RMW commands.

18. The method of claim 10, further comprising:
receiving, by the RMW module, one or more memory addresses and corresponding one or more modification commands from the command pipeline; and
performing, by the RMW module, one or more RMW operations on a memory operatively coupled to the RMW module based at least in part on the received memory addresses and modification commands.

19. The method of claim 18,
wherein the first sequence of memory addresses and the corresponding first sequence of modification commands are received from a first memory pipe, and
wherein the second sequence of memory addresses and the corresponding second sequence of modification commands are received from a second memory pipe.

* * * * *